(12) United States Patent
Morse

(10) Patent No.: US 12,471,734 B2
(45) Date of Patent: Nov. 18, 2025

(54) COFFEE MAKING SYSTEM

(71) Applicant: Jennifer Velasquez Morse, San Clemente, CA (US)

(72) Inventor: Jennifer Velasquez Morse, San Clemente, CA (US)

(73) Assignee: MADE SIMPLI LLC, San Clemente, CA (US)

( * ) Notice: Subject to any disclaimer, the term of this patent is extended or adjusted under 35 U.S.C. 154(b) by 505 days.

(21) Appl. No.: 17/341,284

(22) Filed: Jun. 7, 2021

(65) Prior Publication Data
US 2021/0378437 A1    Dec. 9, 2021

Related U.S. Application Data

(60) Provisional application No. 63/102,284, filed on Jun. 8, 2020.

(51) Int. Cl.
*A47J 31/10*  (2006.01)
*A47J 31/06*  (2006.01)
*A47J 31/20*  (2006.01)
*A47J 31/44*  (2006.01)

(52) U.S. Cl.
CPC .......... *A47J 31/0626* (2013.01); *A47J 31/10* (2013.01); *A47J 31/20* (2013.01); *A47J 31/4407* (2013.01)

(58) Field of Classification Search
CPC ........ A47J 31/10; A47J 31/20; A47J 31/4407; A47J 31/0626; A47J 31/02
See application file for complete search history.

(56) References Cited

U.S. PATENT DOCUMENTS

| | | | |
|---|---|---|---|
| 482,299 | A | 9/1892 | Comstock |
| 512,675 | A | 1/1894 | Appleberg |
| 882,183 | A | 3/1908 | Wells |
| 2,109,363 | A | 2/1938 | Williams |
| 2,562,433 | A | 7/1951 | Moore |
| 3,020,823 | A | 2/1962 | Musso |
| 3,098,425 | A | 7/1963 | Falla |

(Continued)

FOREIGN PATENT DOCUMENTS

| | | |
|---|---|---|
| CH | 243568 | 7/1946 |
| DE | 19548130 | 2/1997 |

(Continued)

OTHER PUBLICATIONS

Search report and written opinion for PCT/US2021/036260, Sep. 29, 2021.

(Continued)

*Primary Examiner* — Tiffany T Tran

(57) ABSTRACT

A coffee making system includes a multi-use filter body. The filter body includes a base, a top portion, and a sidewall connecting the base and the top portion, the sidewall at least partially including filter material. The filter material is adapted to allow the passage of liquid and prevent the passage of coffee grounds. The filter body is selectively useable in an inverted position as a filter in a press coffee making mode of operation and selectively useable in an upright position in a pour-over coffee making mode of operation. In another version, the filter body and a transverse filter body combine to form a dual filter arrangement that can be used in a press coffee maker and/or to make an infused beverage.

26 Claims, 6 Drawing Sheets

(56) References Cited

U.S. PATENT DOCUMENTS

| | | | |
|---|---|---|---|
| 3,279,351 A | 10/1966 | Cohn | |
| 4,365,544 A * | 12/1982 | Howitt | A47J 31/20 |
| | | | D7/317 |
| 5,072,661 A | 12/1991 | Kondo | |
| 5,616,243 A * | 4/1997 | Levy | A23L 2/72 |
| | | | 210/473 |
| 5,618,570 A * | 4/1997 | Banks | A47J 31/20 |
| | | | 99/287 |
| 5,887,510 A * | 3/1999 | Porter | A47J 31/20 |
| | | | 99/287 |
| 5,979,299 A | 11/1999 | Hornsby | |
| 6,038,963 A * | 3/2000 | Patterson | A47J 31/20 |
| | | | 99/287 |
| 6,324,966 B1 | 12/2001 | Joergensen | |
| 10,231,566 B2 | 3/2019 | Neace | |
| 10,368,685 B2 * | 8/2019 | McLean | B01D 11/0253 |
| 10,791,865 B2 * | 10/2020 | Chien | A47J 31/461 |
| 10,791,866 B2 | 10/2020 | Morse | |
| 11,534,017 B2 * | 12/2022 | DeMiglio | A47J 31/0689 |
| 2003/0070979 A1 | 4/2003 | Huang | |
| 2006/0021524 A1 * | 2/2006 | Liu | A47J 31/20 |
| | | | 100/116 |
| 2006/0124628 A1 | 6/2006 | Long | |
| 2010/0263548 A1 * | 10/2010 | Kokatsu | A47J 31/02 |
| | | | 99/306 |
| 2011/0056385 A1 | 3/2011 | McLean | |
| 2012/0328750 A1 | 12/2012 | Giordano | |
| 2013/0233177 A1 | 9/2013 | Lambert | |
| 2014/0016429 A1 | 1/2014 | Constantine | |
| 2015/0030738 A1 | 1/2015 | Meyl | |
| 2016/0166103 A1 * | 6/2016 | Morse | A47J 31/20 |
| | | | 99/297 |
| 2017/0360240 A1 | 12/2017 | Morse | |
| 2019/0069711 A1 * | 3/2019 | Spitzley | A47J 31/468 |
| 2019/0290048 A1 | 9/2019 | Albanese | |
| 2020/0029723 A1 * | 1/2020 | Patel | A47J 31/20 |

FOREIGN PATENT DOCUMENTS

| | | |
|---|---|---|
| EP | 2798985 | 11/2014 |
| FR | 2225123 A1 | 11/1974 |
| WO | WO02/067739 | 9/2002 |
| WO | WO 2010/052111 A1 | 5/2010 |
| WO | WO2012/025125 | 3/2012 |

OTHER PUBLICATIONS

European Search report and written opinion for EP21821928.5-1015/4161326 PCT/US2021/036260, Apr. 4, 2024.
Machine translation of Abstract for FR-2225123A1, Reboul So Sofra, Nov. 1974.
Simpli Press Coffee, Kickstarter 2016, https://www.kickstarter.com/projects/simplijenni/simplipress , First update May 2016.
Simpli Press Coffee, Indiegogo 2016, https://www.indiegogo.com/projects/simpli-press-coffee-clean-smooth-no-mess#/ , First update Jun. 2016.
Simpli Press French Coffee Press, available on Amazon.com at https://www.amazon.com/Simpli-Press-Coffee-Red/dp/B075RGTX4Z?th=1, Sep. 2017.

* cited by examiner

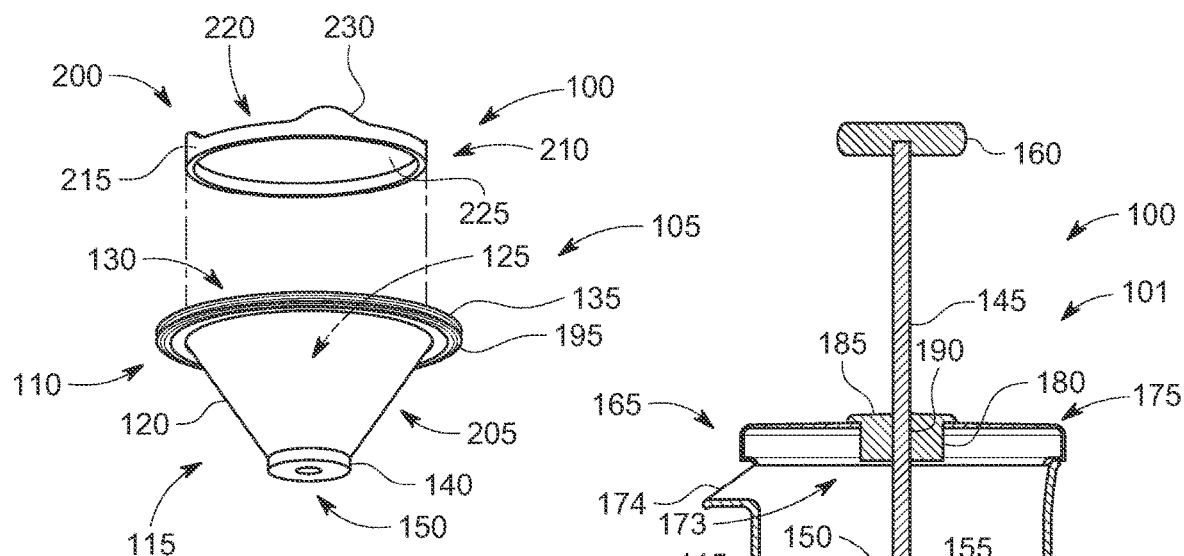
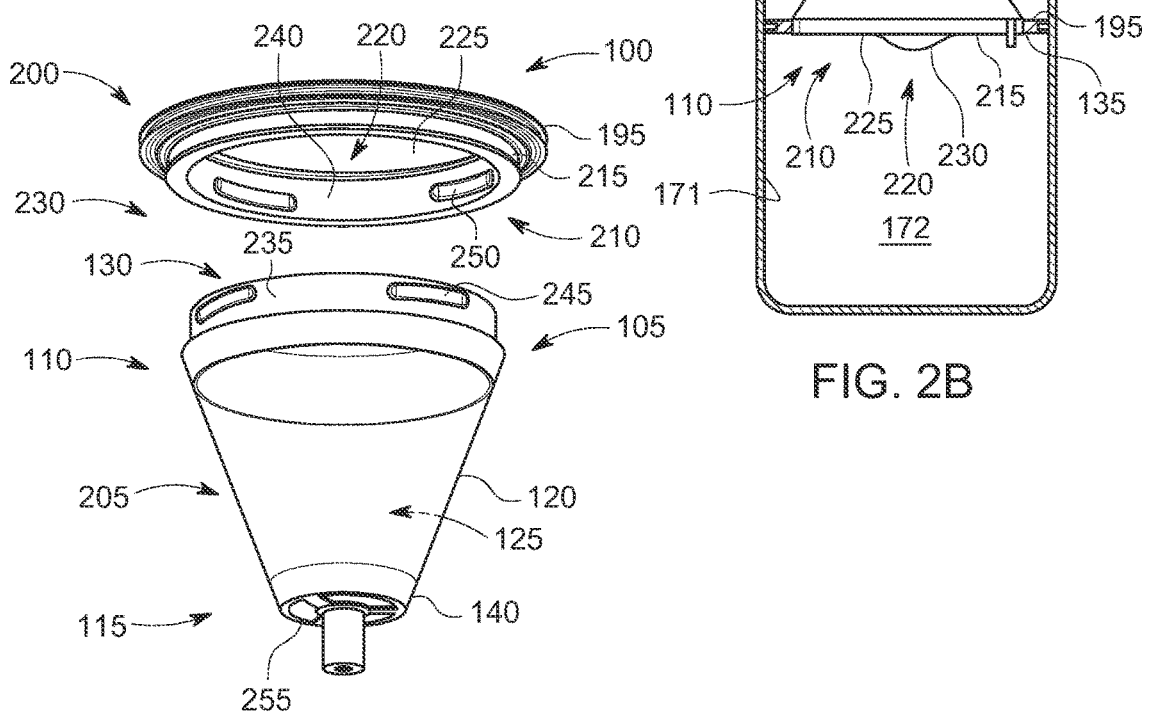
FIG. 2A
FIG. 2B
FIG. 2C

COFFEE MAKING SYSTEM

PRIORITY

The present application claims the benefit of domestic priority based on U.S. Provisional Patent Application 63/102,284 filed on Jun. 8, 2020, the entirety of which is incorporated herein by reference.

BACKGROUND

Coffee drinking has never been more popular. Many people drink coffee throughout the day, whether at home, at work, or on the road. The ability to make coffee conveniently and/or in a particular style is becoming increasingly important.

Coffee can be made in a wide variety of manners, ranging from simple campfire coffee to computerized espresso machines. Avid coffee drinkers often have a particular preference for one or more styles of coffee making. These avid coffee drinkers will even sometimes have a preference for one style of coffee making at one time of day and another style of coffee making at another time of day. The avid coffee drinker might also prefer one style of coffee making with one type of coffee bean, roast, and/or grind and another style of coffee making with a different type of coffee bean, roast, and/or grind. Sometimes in a group of avid coffee drinkers, some coffee drinkers will prefer coffee made in one style and others in the group will prefer coffee made in another style.

Two popular styles of making coffee are with a press coffee maker and a pour-over coffee maker. A press coffee maker, often called a French Press, involves placing ground coffee beans into a cannister or container, such as a carafe made of glass, steel, plastic, or the like, filling the cannister with hot water, allowing the grounds to steep in the hot water for a period of time, and then sliding a filter down the cannister to sequester the grounds at the bottom of the cannister so the steeped coffee can be poured out the top of the cannister. With a pour-over coffee maker, ground coffee beans are placed in a cone shaped funnel that is positioned above a container and separated from the container by a filter. Hot water is poured over the grounds and the coffee flavor is infused into the hot water which then passes through the filter and into the container as coffee.

Many coffee drinkers drink both pressed coffee and pour-over coffee and enjoy the ability to selectively make one type or the other, depending on the situation. For example, some coffee drinkers believe press coffee is preferable with a course grind bean whereas pour-over is preferable with a fine ground. Accordingly, if only one type of grind is available, a coffee drinker might wish to tailor the style of making the coffee to suit the grind. Some coffee drinkers prefer different types of coffee at different times of the day. For example, a coffee drinker might like to have a pot of pressed coffee in the morning and a cup of pour-over coffee in the afternoon. In order to have the flexibility to make pressed coffee and pour-over coffee, a coffee drinker conventionally has had to purchase two separate pieces of coffee-making equipment. Heretofore, there has not been a coffee making system that can be used to make either pressed coffee or pour-over coffee.

Therefore, there is a need for a coffee making system that allows for flexibility in the style of coffee to be made. There is a further need for a coffee making system that is convertible from a press coffee maker to a pour-over coffee maker. There is a further need for a coffee making system that is convenient to use. There is a further need for a coffee making system that can be used to make beverages other than hot coffee.

SUMMARY

The present invention satisfies these needs. In one aspect of the invention, an improved coffee making system is provided.

In another aspect of the invention, a coffee making system can be used to make press coffee and to make pour-over coffee.

In another aspect of the invention, a coffee making system is convertible between two or more of a press coffee maker, a pour-over coffee maker, and an infusion system.

In another aspect of the invention, a coffee making system is convertible between a press coffee maker, a pour-over coffee maker, and an infusion system.

In another aspect of the invention, a coffee making system comprises a filter body that can be used in one orientation in a press coffee making mode of operation and in a second orientation in a pour-over coffee making mode of operation.

In another aspect of the invention, a coffee making system comprises a filter body with a sidewall that extends from a base to an open top portion, the sidewall at least partially including filter material.

In another aspect of the invention, a coffee making system comprises a filter body with a sidewall that extends from a base to an open top portion, the sidewall at least partially including filter material, the sidewall being at least partially conically shaped.

In another aspect of the invention, a coffee making system comprises a filter body with a sidewall that extends from a base to an open top portion, the sidewall at least partially including filter material, the base being connectable to a rod so the filter body can be used in a press coffee maker.

In another aspect of the invention, a coffee making system comprises a filter body with a sidewall that extends from a base to an open top portion, the sidewall at least partially including filter material, and wherein a transverse filter body covers the open top of the filter body.

In another aspect of the invention, a coffee making system comprises a filter body with a sidewall that extends from a base to an open top portion, the sidewall at least partially including filter material, and wherein a transverse filter body covers the open top of the filter body so the coffee making system can be used as an infusion system.

In another aspect of the invention, a coffee making system is used to make coffee.

In another aspect of the invention, a coffee making system is used to make coffee in a pressed coffee making mode of operation.

In another aspect of the invention, a coffee making system is used to make coffee in a pour-over coffee making mode of operation.

In another aspect of the invention, a coffee making system is used to make coffee in a cold brew mode of operation.

In another aspect of the invention, a coffee making system is used to make flavored coffee.

In another aspect of the invention, a coffee making system is used to make an infused beverage other than coffee.

In another aspect of the invention, a coffee making system comprises a filter body, the filter body comprising a base, a top portion, and a sidewall connecting the base and the top portion, the sidewall at least partially including filter material, the filter material being adapted to allow the passage of liquid and prevent the passage of coffee grounds, wherein the filter body is selectively useable in an inverted position as a filter in a press coffee making mode of operation and selectively useable in an upright position in a pour-over coffee making mode of operation.

In another aspect of the invention, a coffee making system comprises a filter body, the filter body comprising a base, a top portion, and a sidewall connecting the base and the top portion, the sidewall at least partially including filter material, the filter material being adapted to allow the passage of liquid and prevent the passage of coffee grounds, wherein the filter body is selectively useable in an inverted position as a filter in a press coffee making mode of operation and selectively useable in an upright position in a pour-over coffee making mode of operation, where the coffee making system further comprising a container having an inner wall defining an interior reservoir, the top portion of the filter body being sized and shaped to be slidable within the interior reservoir along the inner wall of the container and wherein the base is connectable to a rod, the rod being adapted to slidingly extend through an opening in a lid of the container.

In another aspect of the invention, a coffee making system comprises a dual filter arrangement comprising a filter body, the filter body comprising a base, a top portion, a sidewall connecting the base and the top portion, and a transverse filter body connectable to the top portion of the filter body, wherein the sidewall and the transverse filter body each include filter material, the filter material being adapted to allow the passage of liquid and prevent the passage of coffee grounds; a container having an inner wall defining an interior reservoir and an open top, the top portion of the filter body or the transverse filter body being sized and shaped to contact the inner wall and to be slidable within the interior reservoir along the inner wall of the container; and a rod connectable to the base, the rod adapted to extend through the open top of the container and manipulatable by a user to slide the filter body along the inner wall of the container, wherein the dual filter arrangement is useable in an inverted position as a filter in a press coffee making mode of operation.

In another aspect of the invention, a method of making multiple styles of coffee comprises providing a filter body, the filter body comprising a base, a top portion, and a sidewall connecting the base and the top portion, wherein the sidewall includes filter material, the filter material being adapted to allow the passage of liquid and prevent the passage of coffee grounds; in a first mode of operation, using the filter body it in a press coffee making mode of operation; and in a second mode of operation, using the filter body in a pour-over coffee making mode of operation.

In another aspect of the invention, a method of making multiple styles of coffee comprises providing a filter body, the filter body comprising a base, a top portion, and a sidewall connecting the base and the top portion, wherein the sidewall includes filter material, the filter material being adapted to allow the passage of liquid and prevent the passage of coffee grounds; providing a transverse filter body, the transverse filter body being connectable to the top portion of the filter body, the transverse filter body including filter material so that together with the filter body a dual filter arrangement is formed that defines an interior space; in a first mode of operation, using the filter body it in a press coffee making mode of operation; in a second mode of operation, using the filter body in a pour-over coffee making mode of operation, and in a third mode of operation, filling the interior space with an infusion substance and contacting a liquid with the dual filter arrangement to infuse flavor from the infusion substance into the liquid.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

FIG. 2A is a schematic perspective side view of another version of a coffee making system with a version of a filter body having two filters;

FIG. 2B is a schematic partially sectional side view of the coffee making system of FIG. 2A in the form of a press coffee maker;

FIG. 2C is a schematic perspective side view of another version of a coffee making system with another version of a filter body having two filters;

DESCRIPTION

The present invention relates to a beverage making system. In particular, the invention relates to a coffee making system. Although the invention is illustrated and described in the context of being useful for making coffee in as a coffee press and/or a pour-over, the present invention can be used in other ways, as would be readily apparent to those of ordinary skill in the art. Accordingly, the present invention should not be limited just to the examples and embodiments described herein.

Figure 1A:
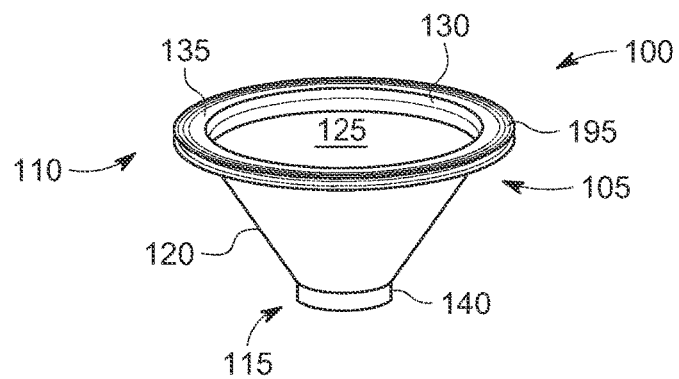
FIG. 1A is a schematic perspective side view of a coffee making system with a filter body of the present invention.
Figure 1B:
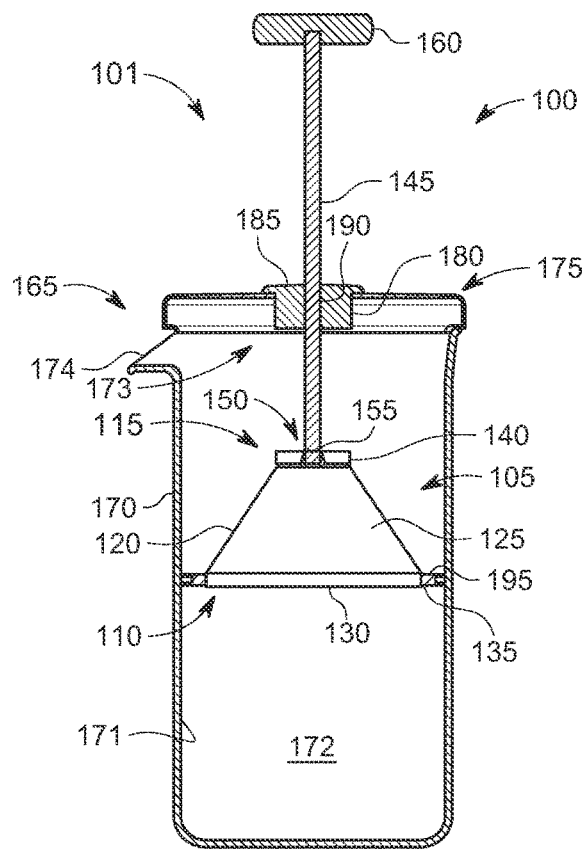
FIG. 1B is a schematic partially sectional side view of a coffee making system in the form of a press coffee maker.
Figure 1C:
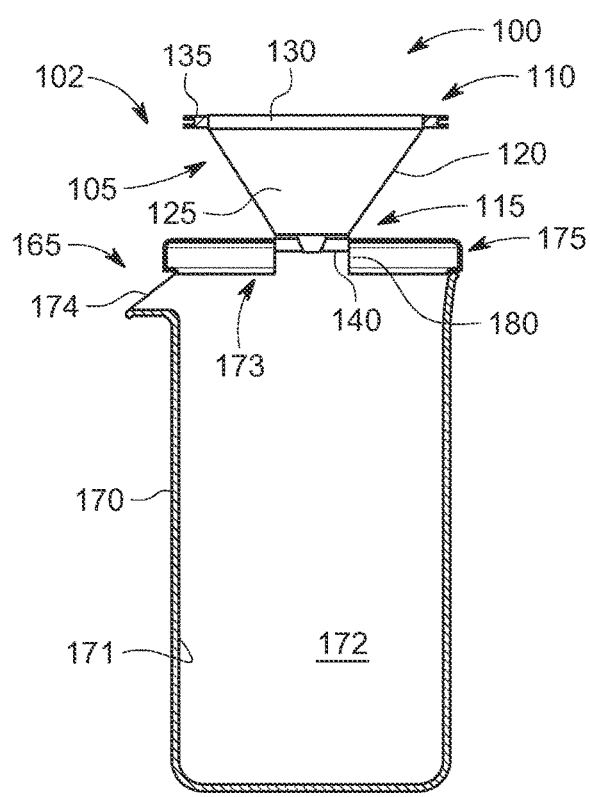
FIG. 1C is a schematic partially sectional side view of a coffee making system in the form of a pour-over coffee maker.

FIGS. 1A, 1B, and 1C show a coffee making system 100 according to one version of the present invention. FIG. 1B shows the coffee making system 100 being used as a coffee press 101, and FIG. 1C shows the coffee making system 100 being used as a pour-over coffee maker 102. The coffee making system 100 includes a filter body 105. The filter body 105 is basket shaped and has top portion 110 and a bottom portion 115 with a sidewall 120 connecting the top portion 110 and the bottom portion 115. The terms "top" and "bottom" are used for clarity and are referenced to the orientation of the filter body 105 as shown in FIG. 1A. However, as will be described, the filter body can be inverted in use in which case the top portion 110 will be located below the bottom portion 115. At least a portion of the sidewall 120 is made of filter material. The filter material of the sidewall 120 is sufficiently porous to allow fluid to pass through while substantially blocking to prevent the passage of at least most coffee grounds. The sidewall 120 defines an interior space 125 within the filter body 105 between the top portion 110 and the bottom portion 115. In the version shown, the sidewall 120 is at least partially conically shaped so that the filter body 105 is at least partially in the shape of a cone with the top portion 110 being larger than the bottom portion 115. Also in the version shown, the top portion 110 has an open top 130 with a rim 135 around the periphery of the open top 130 and at the top of the sidewall 120. The bottom portion 115 includes a base 140 or stand. The base 140 can be solid, have one or more openings, and/or have filter material therein.

The filter material can be any material or combination of materials that allows the passage of liquid while substantially preventing the passage of an infusion substance, such as coffee grounds. For example, the filter material can be any material having one or more small openings adapted for filtration of coffee of other infused beverage. The filter material can be a mixture of different materials, such as a plastic or steel casing with a metallic mesh filter within the casing. Alternatively, the bodies can be structures that support a disposable filter, such as a cone-shaped filter that can be made of filter paper or the like. In this version, the structures can either have large openings where the disposable filter performs all or most of the filtration or there can be additional filter material, such as mesh material, within the openings so there is multi-layered filtration to provide improved filtration. The disposable filter can allow for easier cleaning of the coffee making system 100 following a pour-over operation. The filter material can have openings sized to filter a desired material or substance. For example, in one version, the filter material has openings sized from about 0.05 mm to about 2 mm, or from about 0.1 mm to about 0.1 mm. or about 0.1 mm to about 0.5 mm, or from about 0.2 mm to about 0.4 mm. In one particular version, the filter openings are 0.2 mm, in another version, the filter openings are 0.3 mm, and in another version, the filter openings are 0.4 mm.

The coffee making system 100 can be used to make coffee in a combination of manners, as shown in FIGS. 1B and 1C. In FIG. 1B, the coffee making system 100 is useable as a coffee press 101, or French press, in a coffee press mode of operation. In use in this mode of operation, the filter body 105 is flipped over from its orientation of FIG. 1A. The base 140 of filter body 105 is connected to a rod 145. A releasable connection mechanism 150, such as screw threads or the like, is provided to connect the base 140 to a first end 155 of the rod 145. A knob 160 is provided on another end of the rod 145. The inverted filter body 105 is then inserted into a container 165, such as a carafe 170. The carafe 170 has an inner wall 171 that defines an interior reservoir 172 of the carafe, an open top 173, and a pour spout 174. A lid 175 or container cover member covers the open top 173 and includes a central opening 180 through which the rod 145 passes. A removable lid portion 185 may be provided that has an internal passageway 190 that slidingly receives the rod 145. A gasket 195 can be provided around the rim 135 of the filter body 105. The gasket 195 and the top portion 110 of the filter body 105 are sized and shaped so that the gasket can contact the inner wall 171 of the carafe 170 in a manner where the filter basket can slide within the interior reservoir while limiting the passages of material, such as coffee or coffee grounds between the gasket 195 and the inner wall 171 keeping the coffee grounds below the gasket 195.

To use the coffee making system 100 of the present invention as a coffee press 101, the lid 175 of the carafe 170 and the filter basket 105 are removed so that the interior reservoir 172 of the carafe 170 is exposed through the open top 173. Ground coffee beans of a desired coarseness are placed within the interior reservoir 172 and a desired amount of hot water is added to the interior reservoir. The lid 175 with the rod 145 extending through the lid opening 180 is placed over the open top 173 with the end 155 of the rod 145 connected to the base 140 of the filter body 105. When initially installed, the rod 145 is slid to an upward position within the opening 190 so that the filter body 105 is near the top of the carafe 170 within the interior reservoir 172. The filter body 105 is maintained in the upward position by friction between the gasket 195 and the inner wall 171 of the carafe 170 and/or between the rod 145 and the removeable lid portion 185. While the filter body 105 is in the upward position, the coffee grounds steep into the water to flavor the water and turn it into coffee. After a predetermined amount of time, such as a few minutes, the filter body 105 is lowered within the interior reservoir 172 by a user manipulating the rod 145 such as by pressing downwardly on the knob 160. The coffee passes through the filter portion of the sidewall 120 but the coffee grounds do not. Accordingly, the liquid above the filter body 105 is substantially absent coffee grounds and is ready to be poured through the spout 145 into a cup or other container. The coffee grounds remain below the filter body 105 until the filter body 105 is removed from the carafe 170 so that the coffee grounds can be removed and disposed of.

The coffee making system 100 can also and selectively be used as a pour-over coffee maker 102, as shown in FIG. 1C. In this version, the filter body 105 is used in its upright orientation of FIG. 1A. The base 140 of the filter body 105 is placed into or over the opening 180 in the lid 175 or container cover member of the carafe 170 or atop a different container 165, such as a coffee cup. The interior space 125 of the filter body 105 is filled with coffee grounds of a desired coarseness, and hot water is slowly poured over the top of the coffee grounds in the interior space 125. The flavor of the coffee grounds is infused into the hot water resulting in coffee. The coffee then flows through the filter portion of the sidewall 120 and of the filter body 105 and into the interior reservoir 172 of the carafe 170 or other container 165. Since the pour-over process is generally slow, the coffee passing through the filter body 105 travels down the outside of the sidewall 120 and passes into the interior reservoir 172 through a small space or gap between the base 140 and the walls of the opening 180. Alternatively or additionally, filter material can be provided in at least a portion of the base 140 and/or additional openings and/or filter material can be provided in the lid 175.

Accordingly, the coffee making system 100 of FIGS. 1A, 1B, and 1C is a multi-purpose system that is easily convertible between a coffee press 101 and a pour-over coffee maker 102. The convertibility of the coffee making system 100 offers several advantages over previous coffee makers. For example, the coffee making system 100 of the present invention offers the flexibility of being able to choose the desired mode of coffee making without the need to purchase multiple devices. With the single system, a user can make a pot of press coffee at one time and can make pour-over coffee at another time. In one particular example, a user can make a pot of press coffee in the morning and then make a single cup of pour-over coffee later in the day. In another example, a user can select the mode of coffee making they wish to employ based on the type and/or grind of the coffee beans they have available. The multi-purpose system reduces the amount of space needed for storage since one piece of equipment accomplishes what heretofore needed two pieces of equipment. In addition, the multi-purpose system is more easily transportable. For example, a user can simply take the filter body 105 with them when traveling or camping to be able to use the pour-over feature only.

Though described as being useful for making coffee, the coffee making system 100 of the invention can be used to make other beverages, such as infusions or tinctures. For example, tea leaves, powder, cocoa, fruit, herbs and/or the like can be substituted for the coffee grounds and can be used to infuse flavor into the water. Additionally or alternative, a liquid other than water, such as wine, vodka, or the like, can be used as the liquid into which flavors are infused.

Another version of the coffee making system 100 of the invention is shown in FIG. 2A. In this version the filter body 105 is a dual filter arrangement 200 or system. By dual filter arrangement it is meant that there are two or more filters provided with space between the filters where a substance can be inserted if desired. In addition to the sidewall 120, at least a portion of which includes filter material and thus makes up a first filter 205, a second filter member 210 is provided. The second filter member 210 comprises a transverse filter body 215 that has a central portion 220 that at least partially includes filter material 225. In the version shown, the transverse filter body 215 is sized and shaped to at least partially cover the open top 130 of the filter body 105. By transverse it is meant that when used in connection with the filter body 105, the transverse filter body 215 extends at an angle, such as a non-vertical angle, relative to the sidewalls 120 of the filter body 105. In the specific version shown, the transverse filter body 215 extends horizontally. In another version, the transverse filter body 105 can extend at an angle up to about 30 degrees relative to the horizontal when used in connection with the filter body 105 and when the filter body 105 is in the upright orientation shown in FIG. 2A. The transverse filter body 215 and/or the filter material 225 in the transverse filter body 215 can be substantially flat. Alternatively, the transverse filter body 215 and/or the filter material 225 in the transverse filter body 215 can be non-flat, such as by being curve in cross-section and/or by having protrusions or recesses thereof. In one particular version, at least the top surface of the transverse filter body 215 is substantially flat and horizontal in use so as to make it useful in the press coffee making mode of operation when inverted as shown in FIG. 2B. The transverse filter body 215 is sized and shaped so that it can be received within the open top 130 of the filter body 105 and maintained therein. One or more tabs 230 can optionally be provided to facilitate insertion and removal of the transverse filter body 215 into and out of the open top 130 of the filter body 105. Alternatively, the second filter member 210 can be screwed into position or otherwise secured to the filter body 105, such as by magnetic attraction, press fit, threaded engagement, bayonet connection, or any similar manner of connection.

The dual filter arrangement 200 is shown in use in a press coffee making mode of operation in FIG. 2B. In this mode the coffee making system 100 can be used as a press coffee maker 101 in the similar manner to the version of FIG. 1B, as described above. In such use, the coffee that passes through filter body 105 must pass through two filters and is thus additionally filtered from the coffee grounds below the filter body 105. The dual filter arrangement 200 of FIG. 2A can also be used in the form of a pour-over coffee maker, as shown in FIG. 1C. In this use, the transverse filter body 215 can optionally be removed and the hot water can be poured through the open top 130 to reduce spillage.

The version of FIG. 2B also offers additional modes of use. For example, instead of placing the coffee grounds into the container 165, the coffee grounds or other infusion substance can be placed into the interior space 125 of the filter body 105, and the filter body 105 can be placed in contacted with water or other liquid in the container 165 to make the coffee. This process offers several advantages, such as making it easier to clean the container 165. In addition, the filter basket 105 with the coffee grounds can be removed from the container 165 when the steeping is completed to prevent over-steeping of the coffee. Also, the infusion substance can include coffee flavor additives, such as vanilla beans, almonds, hazelnuts, fruit, herbs, and/or the like can be placed within the interior space 105 to flavor the coffee being made. The version of FIG. 2B can also be useful for making beverages other than hot coffee. For example, cold brewed coffee can be made by inserting coffee grounds into the interior space 125 and leaving the coffee grounds to infuse flavor into cold water in the container 165 over a long period of time.

In another example, an infusion substance other or in addition to coffee can be used to create a flavored beverage in the version of FIGS. 2A and 2B. By infusion substance it is meant any substance, including coffee grounds or powder, that can be used to infuse flavor into a liquid. For example, in one version, an infusion substance can include tea, tea leaves, or tea powder that can be placed in the interior space 105 to make tea within the container 165. Additionally or alternatively, the infusion substance can include pieces of fruit can be placed in the interior space 125 so that fruit flavors can be infused into a liquid in the container 165. Other flavorings, such as cocoa and/or any other item listed above and the like, can be used to make a flavored beverage. The liquid into Thus, the dual filter arrangement 200 allows the coffee making system 100 to be used as an infusion system. A liquid other than water, such as wine, vodka, coffee, tea, or the like, can be used as the liquid into which flavors are infused.

FIG. 2C shows another version of a dual filter arrangement 200. The version of FIG. 2C is similar to the version of FIG. 2A, but in this version, the gasket 195 is located on the transverse filter body 215. A connection mechanism 230 allows the transverse filter body 215 to be connected to the open top 130 of the filter body 105. In the version shown, the open top 130 of the filter body 105 is provided with a male protrusion 235 that can receive a female opening 240 on the transverse filter body 215. Threads or partial threads 245 on the male protrusion 235 can receive threads or partial threads 250 on the female opening 240. Alternatively, the male and female parts can be reversed. Also alternatively, the threaded engagement can be replaced by any other type of connection, such as press fit or bayonet connection. As also shown in the version of FIG. 2C, the base 140 can optionally include a filter portion 255.

Similarly to the filter material in the sidewall 120 of the filter body 105, the filter material 225 of the transverse filter body 215 can be any material having one or more small openings adapted for filtration of coffee of other infused beverage. The filter material can be a mixture of different materials, such as a plastic or steel casing with a metallic mesh filter within the casing. Alternatively, the bodies can be structures that support a disposable filter, such as a flat filter that can be made of filter paper or other material. In this version, the structures can either have large open openings or can include filter material within the openings. The disposable filter can provide an additional layer of filtration in the latter version and/or can allow for easier cleaning of the coffee making system 100 following a pour-over operation. A disposable filter can also be used within the filter body 105 when the filter body 105 is used in conjunction with the transverse filter body 215. In this version, the transverse filter body 215 can be used to secure the disposable filter within the filter body 105 so that the disposable filter is near or contacting the inner surface of the sidewall 120 of the filter body 105. As with the filter material discussed above, the use of a disposable filter in the dual filter version of FIGS. 2A through 2C will make cleaning of the device easier. The openings and/or filtration properties of the filter material 225 can be selected for desired material or substance to be filtered, including the exemplary sized openings discussed above.

Figure 3A:
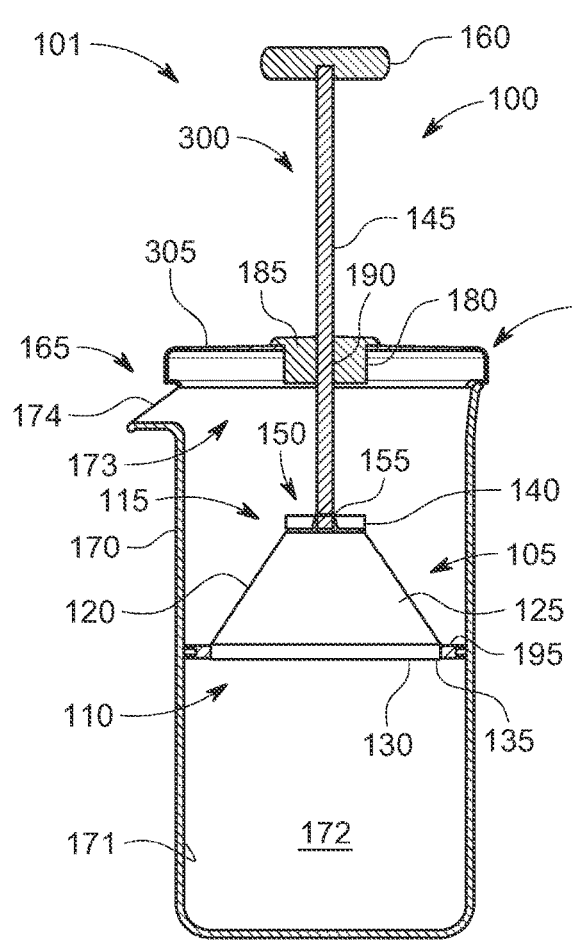
FIG. 3A is a schematic partially sectional side view of another version of a coffee making system in the form of a press coffee maker.
Figure 3B:
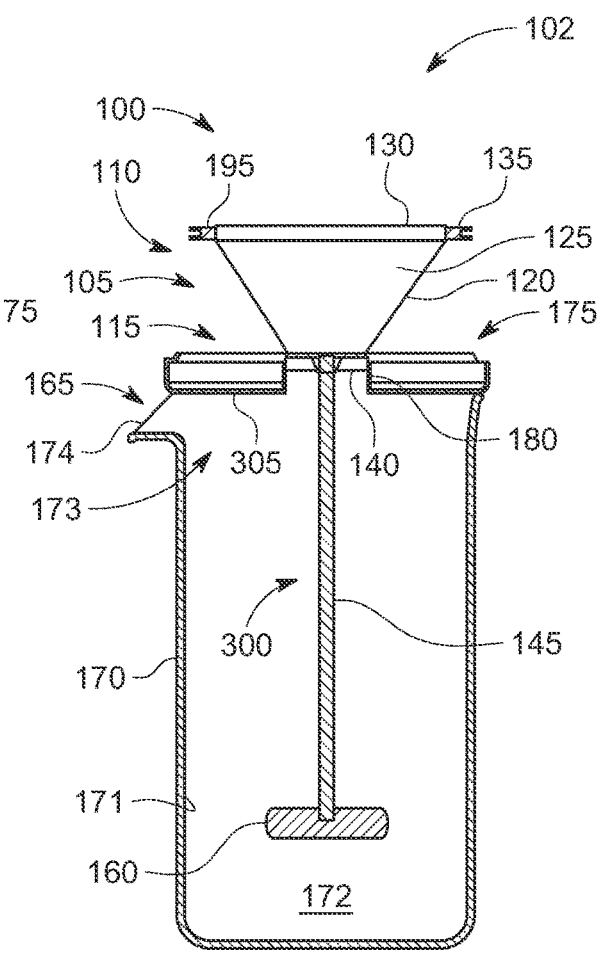
FIG. 3B is a schematic partially sectional side view of the coffee making system of FIG. 3A in the form of a pour-over coffee maker.

Another version of a coffee making system 100 according to the invention is shown in FIGS. 3A and 3B. This version of FIGS. 3A and 3B is similar to the version described in connection with FIGS. 1B and 1C, but with a simplified operation. In this version, a dual purpose filter construct 300 includes the filter body 105, the rod 145, and the lid 175 or container cover member as a unit that can conveniently be used in dual purpose operations. For example, in a first orientation, as shown in FIG. 3A, the dual purpose filter construct 300 can serve as the filtering and pressing mechanism in a press coffee maker 101. Then, to convert the coffee making system 100 into a pour-over coffee maker 102, the dual purpose filter construct 300 is merely flipped over and the removable lid portion 185 is removed. As can be seen, in this mode, the surface of the lid 175 or container cover member that was the top surface 305 in the mode of operation of FIG. 3A is now inverted and is a bottom surface in the mode of operation of FIG. 3B. This version can include the filter body 105 with or without the transverse filter body 215 being attached.

Figure 4A:
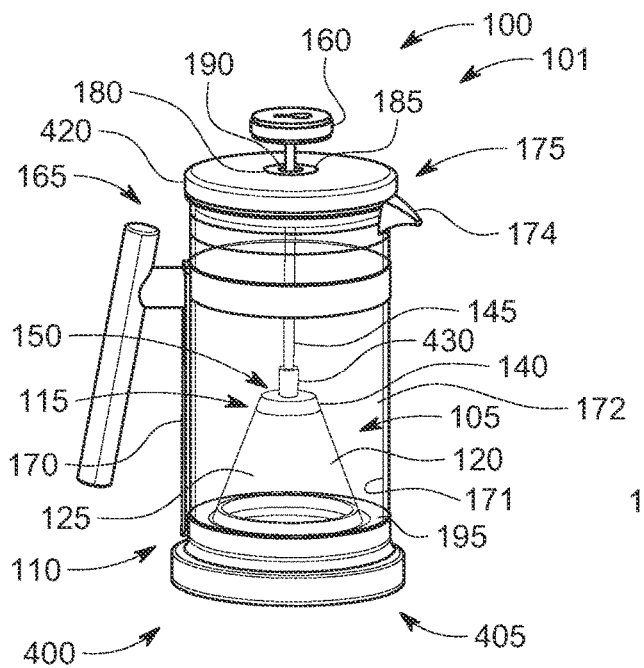
FIG. 4A is a schematic perspective side view of a version of a coffee making system of the invention in the form of a press coffee maker.
Figure 4B:
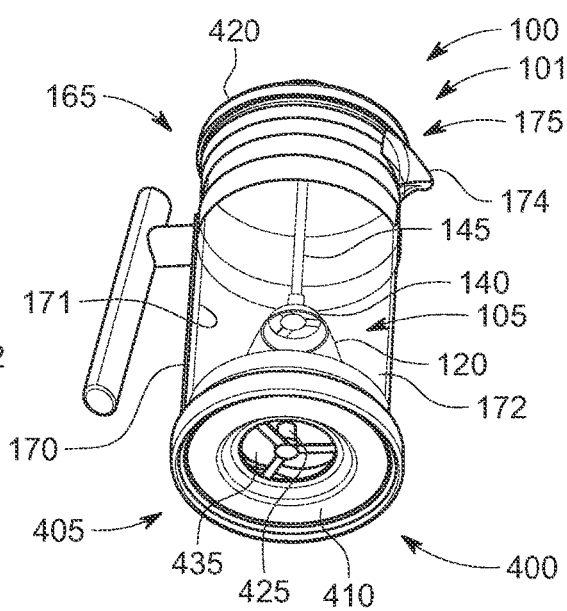
FIG. 4B is a schematic perspective bottom view of the coffee making system of FIG. 4A in the form of a press coffee maker.
Figure 4C:
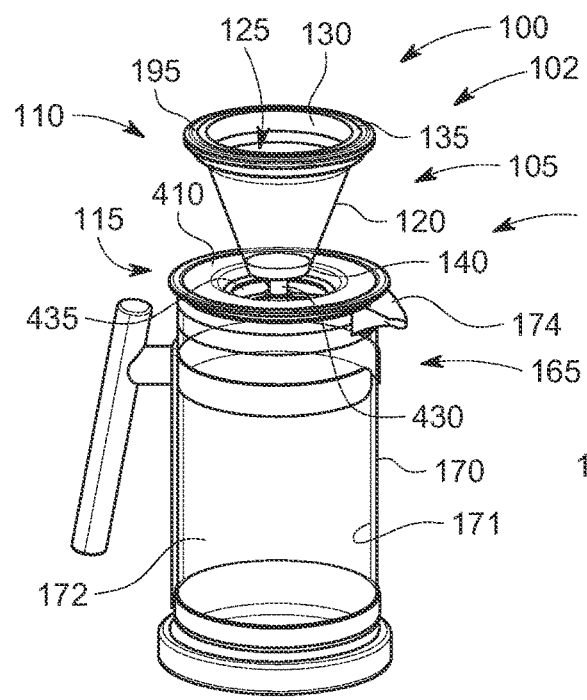
FIG. 4C is a schematic perspective side view of the coffee making system of FIG. 4A converted to a pour-over coffee maker.

Another coffee making system 100 of the invention is shown in FIGS. 4A through 4D. FIGS. 4A and 4B show the coffee making system 100 of this version being used as a press coffee maker 101, the operation of which is similar to that discussed above. In this version, the coffee making system 100 includes a carafe 170 with a container base 400 that includes a recess 405 on the bottom thereof. The recess 405 is a recess into the bottom of the container base 400 and is separated by a wall from the interior reservoir 172 of the carafe 170. The recess 405 is designed to store a pour-over lid 410 that is specifically designed to be used in the pour-over coffee maker 102 mode of operation, as can be seen in FIG. 4C. Accordingly, in this version, the lid 175 or container cover member of the coffee making system 100 includes a press coffee lid 420 that is useful in the press coffee maker 101 mode of operation and the pour-over lid 410 that is useful in the pour-over coffee maker 102 mode of operation. The pour-over lid 410 can include a connection member 425 that is engageable with a connection member 430 on the filter body 105 so the filter body 105 can be secured on the pour-over lid 410 during a pour-over mode of operation. Alternatively, the connection member 425 can be inverted and the pour-over lid 410 can be flipped when used as in a pour-over mode of operation. As can also be seen in the version of FIGS. 4A through 4D, the pour-over lid 410 can be provided with one or more additional openings 435 to help collect coffee or other beverage that is coming through the sidewall 120 of the filter body 105. Optionally, the one or more openings 435 can have filter material across the opening. The pour-over lid 410 is thus able to be stored conveniently in the container base 400 when the coffee making system 100 is not being used in pour-over mode and is easily retrievable from the container base 400 when needed. The pour-over lid 410 can be maintained within the container base 400 by any suitable mechanism, such as by threads, press-fit, magnetic attraction, bayonet connection, and/or the like. Alternatively, rather than the pour-over lid 410 being storable within the container base 400, the pour-over lid 410 can serve at the container base 400. In this version, the entire container base 400 is removable from the container 165 and the entire base can be placed atop the container 165 or other container to support the filter body 105 in the pour-over mode of operation. The container base 400 can be attached to the container 165 in any suitable manner, such as by threads, press-git, magnetic attraction, bayonet connection, and/or the like.

Figure 4D:
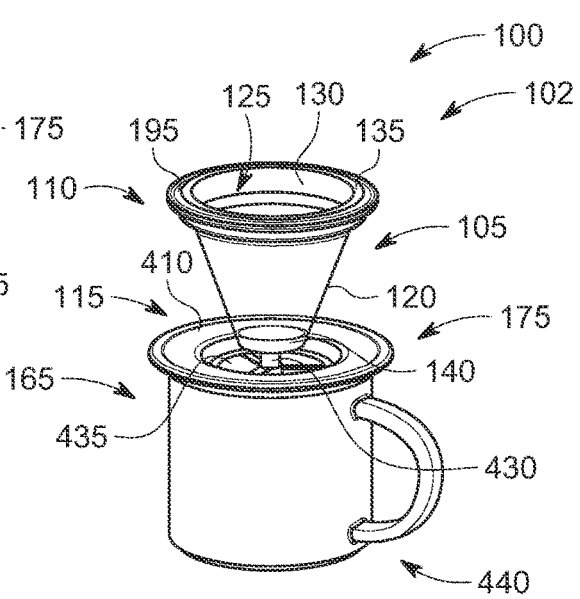
FIG. 4D is a schematic perspective side view of another version of the coffee making system of FIG. 4C also converted to a pour-over coffee maker.

FIG. 4D shows the pour-over lid 410 being used to allow the coffee making system 100 to make coffee as a pour-over coffee maker 102 directly into a container 165 other than the container used for press coffee making. For example, in the version shown, the container 165 is a coffee cup 440. Alternatively, the additional container 165 can be a thermos or a different carafe that is larger than, smaller than, or the same size as the carafe 170 used for the press coffee.

Figure 5A:
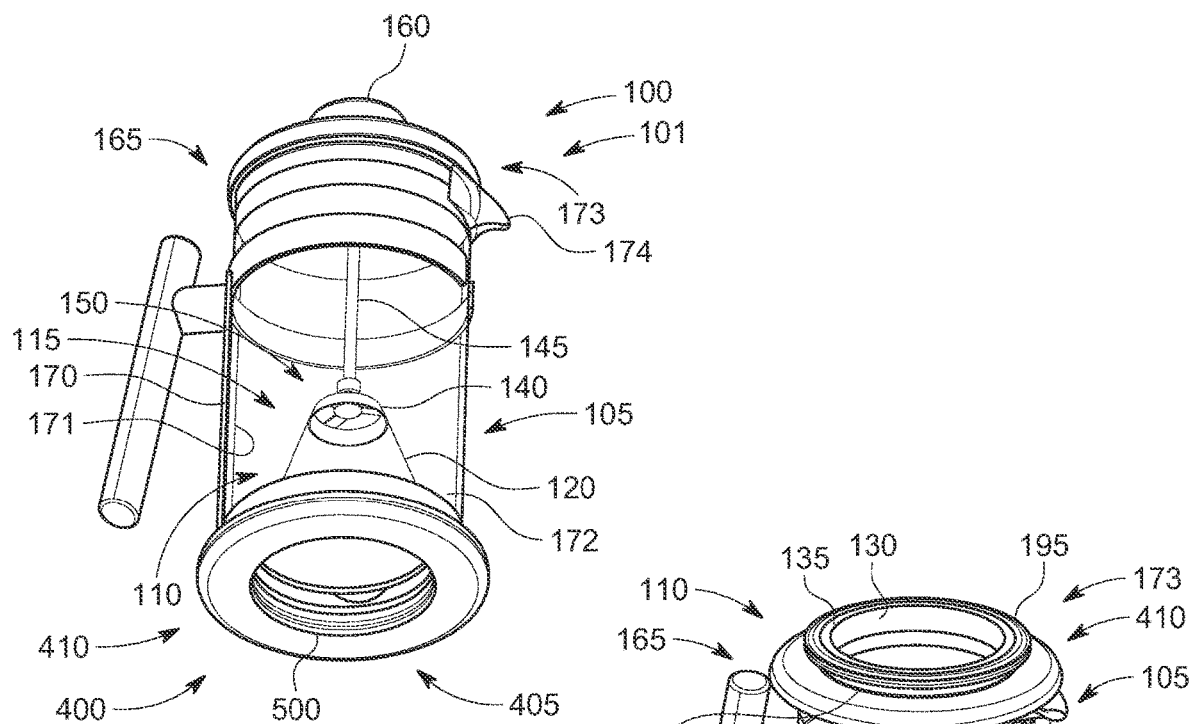
FIG. 5A is a schematic perspective side view of another version of a coffee making system of the invention in the form of a press coffee maker.
Figure 5B:
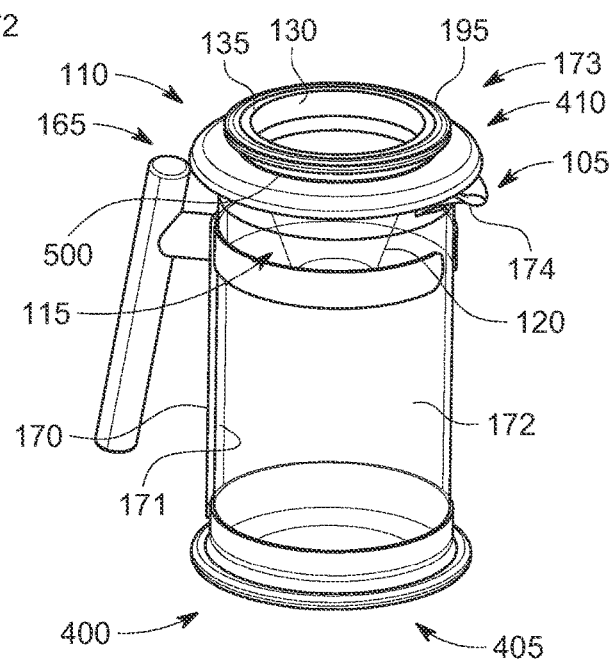
FIG. 5B is a schematic perspective side view of the coffee making system of FIG. 5A converted to a pour-over coffee maker.

Another version of a coffee making system 100 according to the invention is shown in FIGS. 5A and 5B. The version of FIGS. 5A and 5B is similar to the version of FIGS. 4A and 4B. However, in the version of FIGS. 5A and 5B, the pour-over lid 410 is designed with a central opening 500 in place of the connection member 425. The central opening 500 is sufficiently wide to be able to receive at least a portion of the sidewall 120 of the filter body 120, as can be seen in FIG. 5B, so the filter body 105 at least partially extends into the central opening 500 and at least partially into the container 165. For example, the central opening 500 can have a diameter or equivalent dimension that is larger than the diameter or equivalent measurement of the bottom portion 115 of the filter body 105 and smaller than the top portion 110 of the filter body 105 so that the bottom portion 115 of the filter body 105 can be inserted into the central opening 500 but the top portion 110 of the filter body 105 does not pass through. This arrangement provides a secure manner of connection of the filter body 105 to the container 165 during a pour-over mode of operation.

Figure 6:
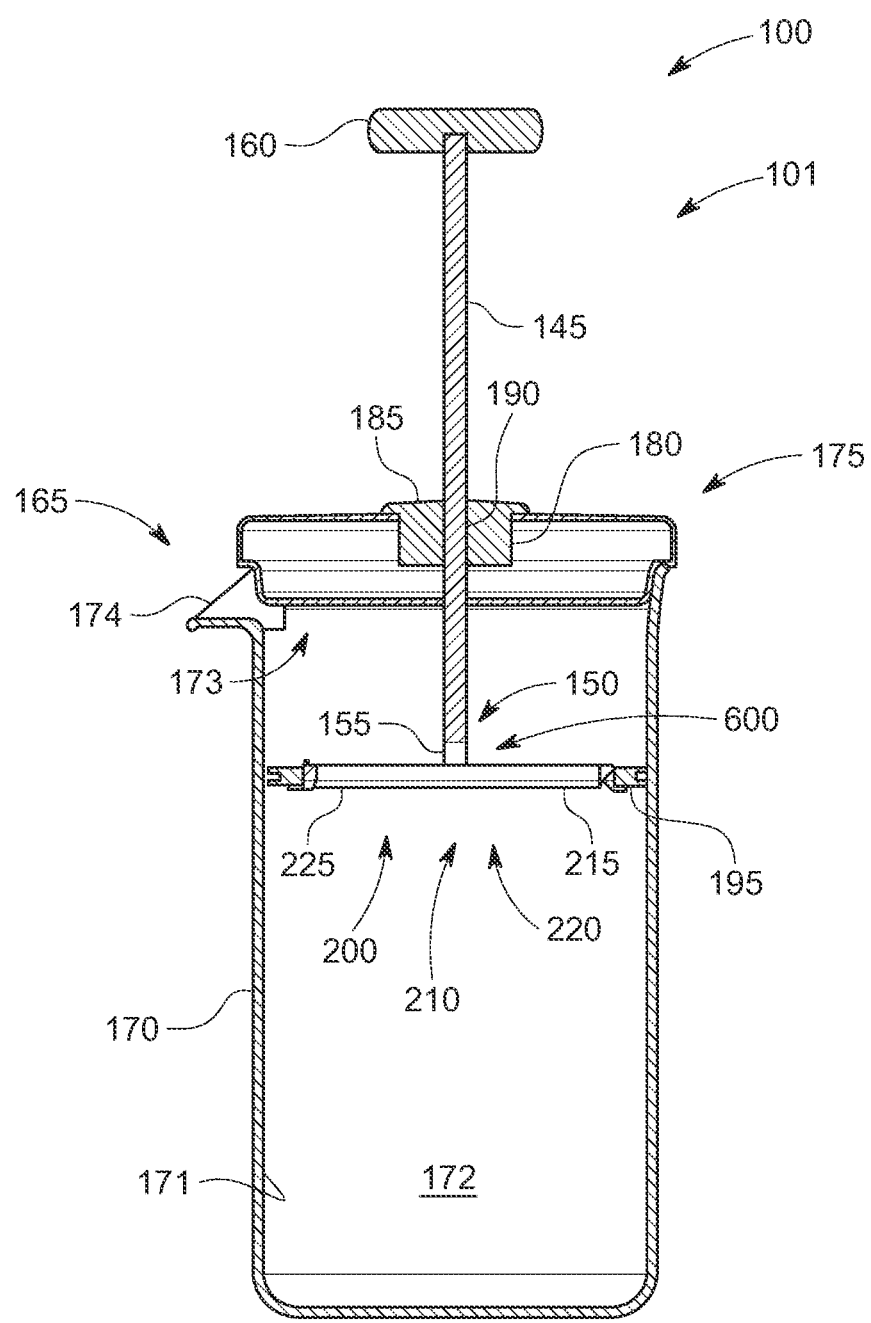
FIG. 6 is a schematic partially sectional side view of another version of a coffee making system in the form of a press coffee maker.

FIG. 6 shows another version of a coffee making system 100 of the invention. The FIG. 6 version is similar to the version shown in FIGS. 2B and 2C. In the FIG. 6 version, the transverse filter body 215 includes a connection mechanism 600 so that the transverse filter body 215 can be connected directly to the rod 145. Accordingly, this version allows a user the option of using the transverse filter body 215 without the filter body 105. Optionally, the connection mechanism 600 can be the same connection mechanism 150 that is used to connect the first end 155 of the rod 145 to the filter body 105. Also, as can be seen in FIG. 6, in this version, the gasket 195 can be provided on the outer edge of the transverse filter body 215, as discussed above in connection with FIG. 2C.

The coffee making system 100 can be made of any suitable materials and can be sized and shaped to suit any desired need. For example, the container 165 and/or carafe 170 can be made of one or more of glass, ceramic, steel, plastic, copper, other metal, and/or any other material suitable for contact with food or beverage. The lid 175 or container cover member and/or parts of the container 165 can be made of any of the above-listed materials, and can be the same material or a different material than the rest of the container 165. The filter body 105 and/or the transverse filter body 215 can be made of steel, plastic, copper, other metal, and/or other material that is suitable for contact with food or beverage. The filter gasket 195 or wiper can be made of one or more of silicone, mesh screen, wired metal, plastic, and other flexible food or beverage safe materials that can slide within the container 165 while preventing the passage of a significant amount of coffee grounds.

The coffee making system 100 of the present invention can thus include and be used in any single manner or combination of manners as discussed above. In a particular version, the coffee making system 100 is a multi-purpose system that can be used as two or more of a press coffee maker 101, a pour-over coffee maker 102, and an infusion system. In a particularly preferred version, the coffee making system 100 is a multi-purpose system that is convertibly useable as a press coffee maker 101, a pour-over coffee maker 102, and an infusion system.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number, and all directional limitations, such as up and down and the like, can be switched, reversed, or changed as long as doing so is not prohibited by the language herein with regard to a particular version of the invention. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Throughout this specification and any claims appended hereto, unless the context makes it clear otherwise, the term "consisting of" and "consisting essentially of" and their variations such as "consists" should be understood to imply the inclusion of a stated element, limitation, or step and not the exclusion of any other elements, limitations, or steps or any other non-essential elements, limitations, or steps, respectively. Throughout the specification, any discussed on a combination of elements, limitations, or steps should be understood to include a disclosure of additional elements, limitations, or steps and the disclosure of the exclusion of additional elements, limitations, or steps. All numerical values, unless otherwise made clear in the disclosure or prosecution, include either the exact value or approximations in the vicinity of the stated numerical values, such as for example about +/− ten percent or as would be recognized by a person or ordinary skill in the art in the disclosed context. The same is true for the use of the terms such as about, substantially, and the like. Also, for any numerical ranges given, unless otherwise made clear in the disclosure, during prosecution, or by being explicitly set forth in a claim, the ranges include either the exact range or approximations in the vicinity of the values at one or both of the ends of the range. When multiple ranges are provided, the disclosed ranges are intended to include any combinations of ends of the ranges with one another and including zero and infinity as possible ends of the ranges. Therefore, any appended or later filed claims should not be limited to the description of the preferred versions contained herein and should include all such alterations, permutations, and equivalents as fall within the true spirit and scope of the present invention.

What is claimed is:
1. A coffee making system comprising:
   a filter body, the filter body comprising a base, a top portion, and a sidewall connecting the base and the top portion, the sidewall at least partially including filter material, the filter material being adapted to allow passage of liquid and prevent passage of coffee grounds,
   a rod releasably connectable to the base of the filter body;
   a container; and
   a container cover member, the container cover member having an opening,
   wherein the filter body is selectively useable in a press coffee making mode of operation and in a pour-over mode of operation, wherein in the press coffee making mode of operation, the filter body is in an inverted position, the rod is connected to the base of the filter body, and the rod extends through the opening in the container cover member, and wherein in the pour-over mode of operation, the filter body is useable in an upright position with the base of the filter body received in the opening in the container cover member.
2. The system according to claim 1 wherein the sidewall is at least partially conical.
3. The system according to claim 1 wherein the container has an inner wall defining an interior reservoir, the top portion of the filter body being sized and shaped to be slidable within the interior reservoir along the inner wall of the container when the filter body is being used in the press coffee making mode of operation.
4. The system according to claim 3 wherein the container cover member comprises a removeable portion having an internal passageway and wherein when in the press coffee making mode of operation, the rod slidingly extends through the internal passageway in the removeable portion inserted into the opening in the container cover member.
5. The system according to claim 4 wherein in the pour over mode of operation, the base of the filter body is disconnectable from the rod and wherein when disconnected, the base of the filter body is adapted to be received in the opening in the container cover member with the removable portion removed.
6. The system according to claim 1 wherein the filter material is disposable filter material and wherein the sidewall comprises one or more openings to allow the passage of liquid passing through the disposable filter material.

7. The system according to claim 1, wherein the filter body comprises a dual filter arrangement, the dual filter arrangement comprising the base, the top portion, the sidewall connecting the base and the top portion, and further comprising a transverse filter body connectable to the top portion of the filter body, wherein the dual filter arrangement is useable in the inverted position as a filter in the press coffee making mode of operation and in the upright position in the pour-over coffee making mode of operation.

8. The system according to claim 7 wherein the filter body and the transverse filter body when connected define an interior space within the dual filter arrangement, the interior space being adapted to hold the coffee grounds.

9. The system according to claim 1 wherein filter body is also useable as an infusion system with the filter body in the inverted position and hanging below the container cover member.

10. A method of making multiple styles of coffee, the method comprising:
providing a filter body, the filter body comprising a base, a top portion, and a sidewall connecting the base and the top portion, wherein the sidewall includes filter material, the filter material being adapted to allow the passage of liquid and prevent the passage of coffee grounds;
using the filter body it in a press coffee making mode of operation, the press coffee making mode of operation comprising:
providing a press coffee container;
connecting the base to a rod;
slidingly passing the rod through an opening in a press coffee cover member;
placing coffee grounds in the press coffee container;
pouring water into the press coffee container;
using the rod to press the filter body down the press coffee container; and
pouring coffee out of the top of the press coffee container; and
using the filter body in a pour-over coffee making mode of operation, the pour-over coffee making mode of operation comprising:
providing a pour-over coffee container;
positioning the filter body in an upright position;
placing the filter body atop the pour-over coffee container;
placing coffee grounds in the filter body;
pouring water over the grounds; and
collecting coffee in the pour-over coffee container under the filter body.

11. The method according to claim 10 wherein:
the press coffee making mode of operation comprises:
slidingly passing the rod through an internal passageway in a removeable portion inserted into the opening in the press coffee cover member.

12. The method according to claim 10 further comprising:
providing a transverse filter body, the transverse filter body being connectable to the top portion of the filter body, the transverse filter body including filter material so that together with the filter body a dual filter arrangement is formed that defines an interior space; and
in a third mode of operation, filling the interior space with an infusion substance and contacting a liquid with the dual filter arrangement to infuse flavor from the infusion substance into the liquid.

13. The method according to claim 10 further comprising in a third mode of operation, using the filter body in an infusion mode of operation with the filter body in an inverted position.

14. The method according to claim 10 wherein the pour-over coffee making mode of operation comprises:
providing a pour-over cover member having an opening, and placing the filter body atop the pour-over cover member so that the filter body is in flow communication with the opening in the pour-over cover member.

15. The method according to claim 14 wherein the press coffee cover member and the pour-over cover member are different cover members.

16. The method according to claim 15 wherein the pour-over cover member is useable as a container base during the press coffee making mode of operation.

17. The method according to claim 10 wherein the press coffee cover member has an opening and wherein the pour-over coffee making mode of operation comprises placing the filter body atop the press coffee cover member so that the filter body is in flow communication with the opening in the press coffee cover member.

18. The method according to claim 17 wherein the cover member includes a removable portion that when inserted adapts the cover member as the press coffee cover member and when removed adapts the cover member as the pour-over cover member.

19. The method according to claim 10 wherein the press coffee container and the pour-over coffee container are the same container.

20. A coffee making system comprising:
a filter body, the filter body comprising a base, a top portion, and a sidewall connecting the base and the top portion, the sidewall at least partially including filter material, the filter material being adapted to allow the passage of liquid and prevent the passage of coffee grounds,
a rod releasably connectable to the base of the filter body;
a container;
a press coffee cover member, the press coffee cover member having an opening sized to receive the rod; and
a pour-over cover member separate from the press coffee cover member, the pour-over cover member having an opening sized to receive a portion of the base of the filter body,
wherein the filter body is selectively useable in a press coffee making mode of operation and in a pour-over mode of operation, wherein in the press coffee making mode of operation, the press coffee cover member is positionable over the container, the filter body is in an inverted position, the rod is connected to the base of the filter body, and the rod extends through the opening in the press coffee container cover member, and wherein in the pour-over mode of operation, the pour-over cover member is positionable over the container, the filter body is in an upright position, and the base of the filter body received in the opening in the pour-over cover member.

21. The system according to claim 20 wherein the pour-over cover member is storably connectable to the container during the press coffee making mode of operation.

22. The system according to claim 20 wherein the pour-over cover member is useable as a container base during the press coffee making mode of operation.

23. The system according to claim 20 wherein the sidewall is at least partially conical.

24. The system according to claim 20 wherein the container has an inner wall defining an interior reservoir, the top portion of the filter body being sized and shaped to be slidable within the interior reservoir along the inner wall of the container when in the press coffee making mode of operation.

25. The system according to claim 20 wherein the press coffee cover member comprises a removeable portion having an internal passageway and wherein when in the press coffee making mode of operation, the rod slidingly extends through the internal passageway in the removeable portion inserted into the opening in the container cover member.

26. The system according to claim 20, wherein the filter body comprises a dual filter arrangement, the dual filter arrangement comprising the base, the top portion, the sidewall connecting the base and the top portion, and further comprising a transverse filter body connectable to the top portion of the filter body, wherein the dual filter arrangement is useable in the inverted position as a filter in the press coffee making mode of operation and in the upright position in the pour-over coffee making mode of operation, and wherein the filter body and the transverse filter body when connected define an interior space within the dual filter arrangement, the interior space being adapted to hold an infusion substance.

* * * * *